United States Patent
Mahadik

(10) Patent No.: US 12,164,965 B2
(45) Date of Patent: Dec. 10, 2024

(54) EFFICIENT ADAPTIVE ALLOCATION OF RESOURCES FOR CONTAINER-BASED COMPUTATION VIA MARKOV DECISION PROCESSES

(71) Applicant: ADOBE INC., San Jose, CA (US)

(72) Inventor: Kanak Vivek Mahadik, San Jose, CA (US)

(73) Assignee: Adobe Inc., San Jose, CA (US)

( * ) Notice: Subject to any disclaimer, the term of this patent is extended or adjusted under 35 U.S.C. 154(b) by 505 days.

(21) Appl. No.: 17/443,928

(22) Filed: Jul. 28, 2021

(65) Prior Publication Data

US 2023/0032853 A1 Feb. 2, 2023

(51) Int. Cl.
    *G06F 9/50* (2006.01)
(52) U.S. Cl.
    CPC .................. *G06F 9/5027* (2013.01)
(58) Field of Classification Search
    None
    See application file for complete search history.

(56) References Cited

U.S. PATENT DOCUMENTS

| | | | |
|---|---|---|---|
| 10,970,127 B1* | 4/2021 | Freeman | G06F 9/45558 |
| 11,328,104 B2* | 5/2022 | Koutsomanis | G06F 9/44505 |
| 2018/0316751 A1* | 11/2018 | Shen | H04L 41/22 |
| 2022/0164186 A1* | 5/2022 | Pamidala | G06F 18/2155 |

OTHER PUBLICATIONS

Pascual et al. (Effects of Reducing VMs Management Times on Elastic Applications, May 26, 2018, Journal of Grid Computing 16, pp. 513-530) (Year: 2018).*
Baresi et al. (A discrete-time feedback controller for containerized cloud applications, Nov. 2016, Proceedings of the 2016 24th ACM SIGSOFT International Symposium on Foundations of Software Engineering. pp. 217-228) (Year: 2016).*
Krishnamurthy et al. (Hidden Markov Model Multiarm Bandits: A Methodology for Beam Scheduling in Multitarget Tracking, Dec. 2001, pp. 2893-2908) (Year: 2001).*
Esteves et al. (WaaS: Workflow-as-a-Service for the Cloud with Scheduling of Continuous and Data-Intensive Workflows, Mar. 2016, The Computer Journal, vol. 59, Issue 3, pp. 371-383) (Year: 2016).*

(Continued)

*Primary Examiner* — Lewis A Bullock, Jr.
*Assistant Examiner* — Melissa A Headly
(74) *Attorney, Agent, or Firm* — Shook, Hardy & Bacon L.L.P.

(57) ABSTRACT

Systems and methods that enable the efficient and adaptive allocation of resources dedicated to a container-based computation (e.g., one or more information processing tasks) are provided. A container controller is employed to launch and dynamically update (e.g., manage) the resource allocation (e.g., indicated by a selected configuration) for a set of containers. The container controller implements a Markov Decision Process (MDP)-based control loop to adaptively configure (e.g., allocate resources for) and reconfigure the set of containers. In some embodiments, the MDP of the control loop is a single-state MDP (e.g., a multi-armed bandit decision process). In such embodiments, each possible configuration for the set of containers is an arm on the multi-armed bandit.

18 Claims, 5 Drawing Sheets

(56) References Cited

OTHER PUBLICATIONS

Baresi et al. (Year: 2018).*
Kirshnamurthy NPL (Year: 2016).*
Pascual NPL (Year: 2001).*
Abdelbaky, M., Diaz-Montes, J., Parashar, M., Unuvar, M., & Steinder, M. (Dec. 2015). Docker containers across multiple clouds and data centers. In 2015 IEEE/ACM 8th International Conference on Utility and Cloud Computing (UCC) (pp. 368-371). IEEE.
Auer, P., Cesa-Bianchi, N., Freund, Y., & Schapire, R. E. (2002). The nonstochastic multiarmed bandit problem. SIAM journal on computing, 32(1), 48-77.
Burns, B., Grant, B., Oppenheimer, D., Brewer, E., & Wilkes, J. (2016). Borg, Omega, and Kubernetes: Lessons learned from three container-management systems over a decade. Queue, 14(1), 70-93.
Calheiros, R. N., Masoumi, E., Ranjan, R., & Buyya, R. (2014). Workload prediction using ARIMA model and its impact on cloud applications' QoS. IEEE transactions on cloud computing, 3(4), 449-458.
Hightower, K., Burns, B., and Beda, J. Kubernetes: up and running: dive into the future of infrastructure. "O'Reilly Media, Inc.",2017.
Hindman, B., Konwinski, A., Zaharia, M., Ghodsi, A., Joseph, A. D., Katz, R. H., . . . & Stoica, I. (Mar. 2011). Mesos: A platform for fine-grained resource sharing in the data center. In NSDI (vol. 11, No. 2011, pp. 22-22).
Lattimore, T., and Szepesv'a Ri, C. Bandit algorithms. Cambridge University Press, 2020.
Lorido-Botran, T., Miguel-Alonso, J., & Lozano, J. A. (2014). A review of auto-scaling techniques for elastic applications in cloud environments. Journal of grid computing, 12(4), 559-592.
Mauro, T. Adopting microservices at netflix: Lessons for architectural design. https://dzone.com/articles/adopting-microservices-netflix.
Park, Y., Mahadik, K., Rossi, R. A., Wu, G., & Zhao, H. (Nov. 2019). Linear quadratic regulator for resource-efficient cloud services. In Proceedings of the ACM Symposium on Cloud Computing (pp. 488-489).
White, J. (2012). Bandit algorithms for website optimization. "O'Reilly Media, Inc.".

\* cited by examiner

EFFICIENT ADAPTIVE ALLOCATION OF RESOURCES FOR CONTAINER-BASED COMPUTATION VIA MARKOV DECISION PROCESSES

BACKGROUND

Computation (e.g., information processing) is routinely performed via virtualized resources (e.g., cloud- and/or web service-based computation). Such virtualized resources may include virtual machines (VMs) and containers. In general, VMs virtualize a lower physical layer of a resource stack and implement a copy of an operating system (OS) on top of the virtualized physical layer. In contrast to VMs, containers are implemented on top of the physical layer and virtualize an OS layer of the resource stack that is above the physical layer. A container implements copies of one or more applications on top of the virtualized OS layer. A single application, under a sufficient workload, may be distributed across multiple containers to increase a number of central processing units (CPUs) available for the information processing (IP). Increasing the number of available CPUs may increase the number of CPU cycles available (per unit time) for parallel IP. Thus, an application may be distributed across a set of containers. Furthermore, as the computational workload varies, the resources dedicated to a set of containers may be scaled down (e.g., in response to decreasing workloads) or scaled up (in response to increasing workloads). However, such scaling events may provide temporary disruptions to computational services provided to an end user.

Ideally, the computational resources available to a set of containers closely matches the current demand under the application's workload. If not enough resources are available (e.g., with respect to the current demand), the speed of the IP will be diminished. However, if too many resources are made available, then the resources may be unavailable to other IP tasks, leading to resource wastage. That is, ideally, the computational resources are efficiently allocated to a current workload associated with an IP task. Thus, when operating a set of containers, decisions must be made as to the resources allocated to the set of containers. Such decisions may include the number of containers (or processing devices/cycles) made available to the application, as well as trigger levels for scaling events. Traditionally, configuring a set of containers for an IP task is performed manually, or partially automated via heuristics. Such traditional methods often result in the inefficient allocation of resources and/or disruptions in computational services.

SUMMARY

The technology described herein is directed towards enhanced methods and systems for the efficient and adaptive allocation of resources for container-based computation via Markov Decision Processes (MDP). In at least some embodiments, the MDP is state-independent (or a single-state) MDP. Thus, in these non-limiting embodiments, the MDP may be a multi-armed banded (MAB) decision process. One non-limiting embodiment method is for implementing an application (via a first set of containers) under a first workload. The method may include acquiring utilization data for the first set of containers. The first set of containers may have been launched with a first configuration of a set of configurations, or at least the first set of containers is currently configured with the first configuration. For example, the first set of containers may have been launched with different configurations, but has been reconfigured and/or rescaled with the first configuration since the initial launching of the first set of containers with the different configuration of the set of configurations. Each configuration of the set of configurations may correspond to a candidate allocation of the computational resources for the first set of containers. A set of rewards (or reward metrics) may indicate computational resource allocation efficiencies associated with the set of configurations (as measured via encodings of the utilization data). The method may include updating the set of rewards based on an analysis of the acquired utilization data. Each reward metric of the set of reward metrics may correspond to a separate configuration of the set of configurations. Updating the set of reward metrics may include updating a first reward metric of the set of reward metrics. The first reward metric may correspond to the first configuration. Updating the first reward may be based on an analysis of the utilization data. The utilization data may encode a utilization of a first allocation of the computational resources. The first allocation may correspond to the first configuration, when the first set of the container implements the application under the first workload. A second configuration of the set of configurations may be selected. The selection of the second configuration may be based on a selection algorithm and the updated set of reward metrics. A second set of containers may be launched with the second configuration. In other embodiments, the first set of containers may be reconfigured with the second configuration. In at least one embodiment, the first and second configurations are the same configuration of the set of configurations.

In various embodiments, the method may further include acquiring additional utilization data for the second set of containers. The additional utilization data may encode a utilization of a second allocation of the computational resources. The second allocation may correspond to the second configuration, when the second set of containers implements the application under a second workload. The set of reward metrics may be updated. Updating the set of reward metrics may including updating a second reward metric of the set of reward metrics. The second reward metric may correspond to the second configuration. Updating the second reward metric may be based on an analysis of the additional utilization data. A third configuration of the set of configurations may be selected. The selection of the third configuration may be based on the selection algorithm and the updated set of reward metrics. A third set of containers may be launched with the third configuration. In other embodiments, the first or the second set of containers may be reconfigured with the third configuration. In at least one embodiment, the third configuration may be the same configuration as at least one of the first or second configurations of the set of configurations.

In various embodiments, each configuration of the set of configurations may include (or at least indicate) an initial number of processing devices (and/or cycles) of the computing resources that are initially provided to the first set of containers when the first set of containers implements the application under the first workload. The utilization data may encode a time series of an actual number of processing units of the computing resources that are provided to the first set of containers when the first set of containers implements the application under the first workload. The utilization data may further encode a time series of a number of processing devices that the first set of containers utilizes when the first set of containers implements the application under the first workload. In various embodiments, the analysis of the utilization data may include generating a time series of a difference between the actual number of processing units that are provided to the first set of containers when the first set of containers implements the application under the first workload and the number of processing devices that the first set of containers utilizes when the first set of containers implements the application under the first workload. A processor-waste metric may be determined and/or calculated. The determination of the processor-waste metric may be based on an accumulation, summation, integration, and/ or time averaging of the time series of the difference between the actual number of processing units that are provided to the first set of containers when the first set of containers implements the application under the first workload and the number of processing devices that the first set of containers utilizes when the first set of containers implements the application under the first workload. A value for the updated first reward metric may be determined based on the processor-waste metric.

In various embodiments, each configuration of the set of configurations includes (or at least indicates) a lower-utilization threshold indicating a first condition that triggers a scale-up event for the set of containers when the first set of containers implements the application under the first workload. Each configuration of the set of containers may additionally include (or at least indicate) an upper-utilization threshold indicating a second condition that triggers a scale-down event for the first set of containers when the first set of containers implements the application under the first workload. The utilization data may encode a time series of a number of scaling events for the first set of containers when the first set of containers implements the application under the first workload. The time series of the number of scaling events may include a combination of a number of the scale-up events for the first set of containers when the first set of containers implements the application under the first workload and a number of the scale-down events for the first set of containers when the first set of containers implements the application under the first workload. The analysis of the utilization data may include determining a scaling-event metric. Determining the scaling-event metric may be based on an accumulation, summation, integration, and/or time averaging of the time series of the number of scaling events for the first set of containers when the first set of containers implements the application under the first workload. The analysis of the utilization data may further include determining a value for the updated first reward metric based on the scaling-event metric.

In some embodiments, the scale-up events include increasing a cardinality of the first set of containers when the first set of containers implements the application under the first workload. Similarly, the scale-down events may include decreasing the cardinality of the first set of containers when the first set of containers implements the application under the first workload. The selection algorithm may include at least one of an epsilon-greedy algorithm, a Boltzmann exploration algorithm, an upper confidence bounds (UCB) algorithm, Thompson sampling, explore-then-commit, and an exponential weight algorithm (e.g., EXP3) for exploration and exploitation. A value of the updated first reward metric may be based on an inverse of a weighted linear combination of a resource-waste metric and a scaling-event metric that are determined via the analysis of the utilization data. The selection algorithm may select the second configuration from the set of configurations based on at least one of a ranking of the updated set of reward metrics, an exploration-exploitation balancing policy, and a stochastically determined value.

DETAILED DESCRIPTION

Figure 1:
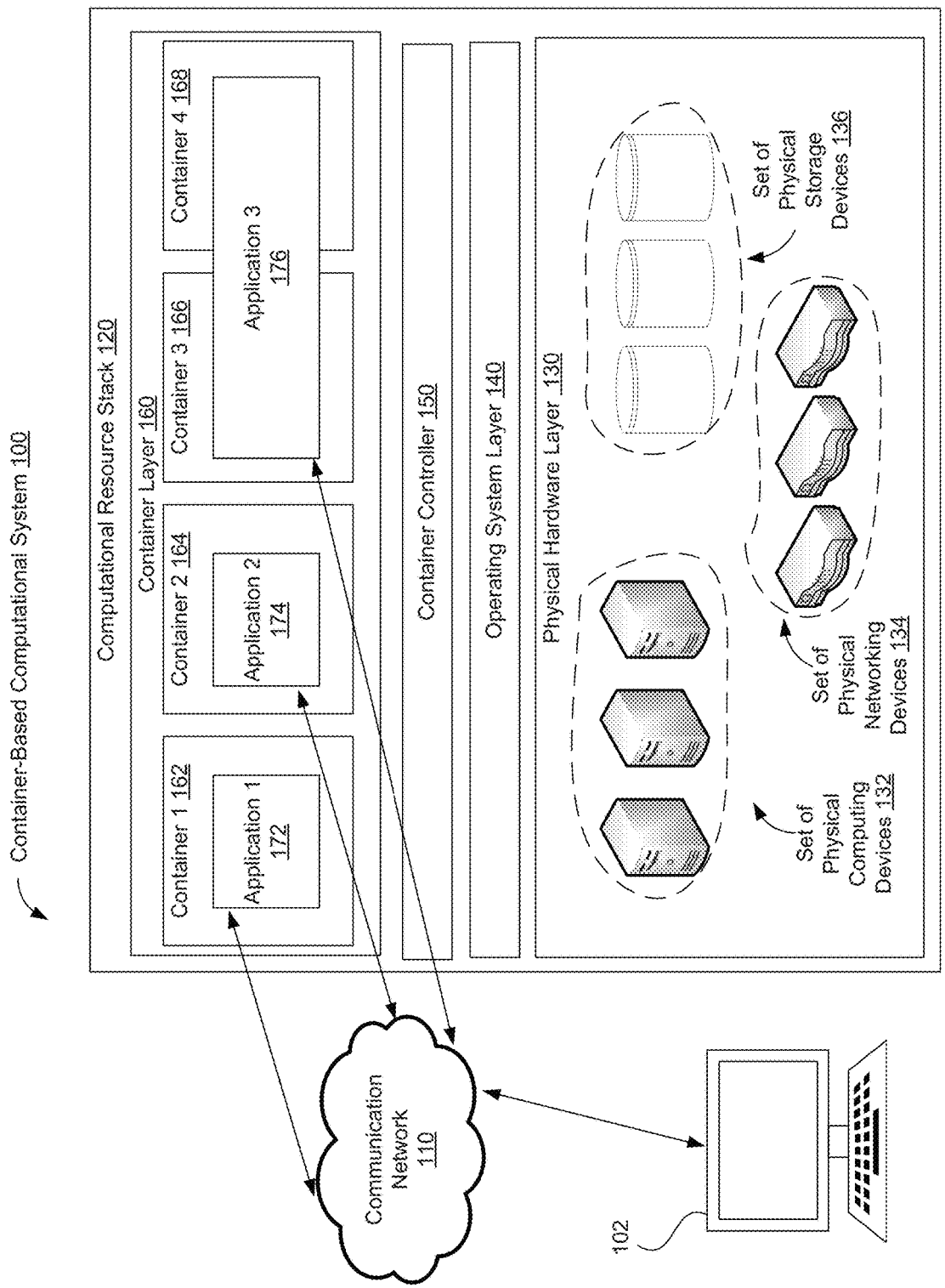
FIG. 1 illustrates an enhanced container-based computational system implementing various embodiments presented herein.

As used herein, the term "set" may be employed to refer to an ordered (i.e., sequential) or an unordered (i.e., non-sequential) collection of objects (or elements), such as but not limited to machines (e.g., computer devices), physical and/or logical addresses, graph nodes, graph edges, and the like. A set may include N elements, where N is any non-negative integer. That is, a set may include 0, 1, 2, 3, . . . N objects and/or elements, where N is a positive integer with no upper bound. Therefore, as used herein, a set may be a null set (i.e., an empty set) that includes no elements (e.g., N=0 for the null set). A set may include only a single element. In other embodiments, a set may include a number of elements that is significantly greater than one, two, three, or billions of elements. A set may be an infinite set or a finite set. In some embodiments, "a set of objects" that is not a null set of the objects may be interchangeably referred to as either "one or more objects" or "at least one object." A set of objects that includes at least two of the objects may be referred to as "a plurality of objects."

As used herein, the term "subset," is a set that is included in another set. A subset may be, but is not required to be, a proper or strict subset of the other set that the subset is included within. That is, if set B is a subset of set A, then in some embodiments, set B is a proper or strict subset of set A. In other embodiments, set B is a subset of set A, but not a proper or a strict subset of set A. For example, set A and set B may be equal sets, and set B may be referred to as a subset of set A. In such embodiments, set A may also be referred to as a subset of set B. Two sets may be disjointed sets if the intersection between the two sets is the null set.

The embodiments are directed towards systems and methods that enable the efficient and adaptive allocation of resources dedicated to container-based computation (e.g., one or more information processing tasks). The embodiments employ a container controller to launch and dynamically update (e.g., manage) the resource allocation (e.g., indicated by a selected configuration) for a set of containers. The container controller may implement a Markov Decision Process (MDP)-based control loop to adaptively configure (e.g., allocate resources for) the set of containers. In some embodiments, the MDP of the control loop is a single-state MDP (e.g., a multi-armed bandit decision process). In such embodiments, each possible configuration for the set of containers is an arm of the multi-armed bandit.

More particularly, an application may be distributed across the set of containers. In some embodiments, the set of containers includes a single container. In other embodiments, the set of containers includes more than one or more containers. Thus, the set of containers may include one or more containers. A set of configurations is made available to the container controller. Each configuration of the set of configurations corresponds to a separate possible, potential, and/or candidate allocation of computational resources that may be made available to (e.g., allocated for) the set of containers. Thus, the set of configurations corresponds to a configuration space for the set of containers. When launching (e.g., initializing) the set of containers, the container controller selects a configuration for the set of configurations via a selection algorithm. The set of containers is employed to implement the application, and the application is executed under a temporally varying workload. Under the workload, temporally varying utilization data is generated that encodes the utilization of the resources allocated for the set of containers. As noted throughout, the selection of the configuration for the set of containers may be based on an MDP, such as but not limited to a MAB decision process, where each configuration of the set of configurations corresponds to an arm of the MAB.

Once the set of containers is initially launched, the controller implements a control loop for the set of containers. The utilization data provides feedback for the control loop. More specifically, the container controller actively monitors utilization data for the set of containers and adaptively reconfigures (e.g., updates) the set of containers based on an analysis of the utilization data (e.g., the feedback of the control loop). When reconfiguring the set of containers, another configuration from the set of configurations may be selected via the selection algorithm. The updated configuration may be the same configuration or a different reconfiguration dependent on an analysis of the utilization data, a stochastic nature of the selection algorithm, and/or estimates for a reward metric corresponding to each configuration in the set of configurations. When the updated configuration is different than the current configuration, the allocation of the resources dedicated to the set of containers may be updated (e.g., a scale-up or a scale-down event may be triggered for the set of containers). The container controller continues to monitor the utilization data, in view of the updated set of controllers, and continues to adapt the configuration of the set of containers based on the monitored utilization data and the MDP (e.g., a MAB decision process).

When launching or updating the set of containers, the container controller may implement an MDP to select a configuration from the set of configurations. As noted above, the MDP may be a multi-armed bandit (MAB) decision process, e.g., an MDP that is state-independent or one that includes only a single state. In the embodiments, each configuration of the set of configurations is representative of (or analogous to) a separate arm on the MAB. A reward metric for each arm (e.g., for each configuration) may be iteratively estimated based on how closely the currently allocated resources match the current workload of the application, as encoded in the utilization data. Thus, the controller may iteratively estimate and use a set of rewards, where there is a one-to-one (1-to-1) correspondence between the configurations of the set of configurations and the rewards of the set of rewards. The MAB decision process may balance the exploration/exploitation tradeoff inherent in the iterative estimation of the rewards via one or more selection algorithms, such as but not necessarily limited to stochastic selection algorithm, e.g., a non-deterministic selection algorithm. In some embodiments, the selection algorithm may be a deterministic selection algorithm. The (stochastic or deterministic) selection algorithm may employ the value for a current estimate of each of the rewards of the set of rewards to select a configuration from the set of configurations. Such selection algorithms may include, but need not be limited to an epsilon-greedy algorithm, a softmax algorithm, an upper confidence bound (UCB) algorithm, Thompson sampling, explore-then-commit, an exponential weight algorithm (e.g., EXP3) for exploration and exploitation, and the like. In some embodiments, the selection algorithm selects a configuration from the set of configurations based on a ranking of the set of reward metrics, an exploration-exploitation balancing policy, and/or a stochastically determined value (e.g., a random or a pseudo-random value).

Although the discussion throughout is directed towards MAB (e.g., single-state MDP) embodiments, it should be understood that the embodiments are not so constrained, and a multi-state MDP may be employed in other embodiments. For instance, a plurality of states may be defined for the set of containers (e.g., states characterized by current and/or previous portions of the utilization data), and the set of actions of the MDP may correspond to the set of configurations. The selection of a configuration (e.g., an action to perform via the MDP) may be based on the set of containers' current state, and possibly one or more previous states. The performance of an action (e.g., the reconfiguration of the set of containers) may transition the current state of the set of containers to another available state (e.g., an increase or decrease in the utilization of the allocated resources).

In various embodiments, each configuration of the set of configurations may indicate a measure of an amount of CPUs allocated for the set of containers. The measure of the amount of allocated CPUs may be indicated as cpu_num. In some embodiments, cpu_num may indicate a fractional proportion of a container's host machine CPU cycles allocated for utilization by the container (e.g., 0.0 cpu_num 1.0). In other embodiments, cpu_num may be an integer that indicates a number of CPU devices allocated to each container in the set of containers. In still other embodiments, cpu_num may be an integer that indicates a total number of CPU devices allocated to the entirety of the set of containers. In some embodiments, each container in the set of containers may be allocated an equivalent number of CPU devices. Thus, cpu_num may scale linearly with a cardinality of the set of containers. In other embodiments, the number of CPU devices allocated for the containers may vary across the elements of the set of containers.

Each configuration of the set of configurations may additionally indicate a trigger condition for initiating a scale-up event (e.g., an upper-utilization threshold) for the set of containers, as well as a trigger condition for initiating a scale-down event (e.g., a lower-utilization threshold) for the set of containers. The upper-utilization threshold may be a high-water mark (hw) and may be indicated as scal_hi. The lower-threshold may be a low-water mark (lw) and may be indicated as scal_lo. In various embodiments, $0.0 \leq scal\_lo \leq scal\_hi \leq 1.0$. The utilization data encodes a fractional utilization of the allocated resources (e.g., a percentage of the allocated CPUs (as indicated by num_cpu) being utilized, as a function of time). When the current utilization exceeds the upper-utilization threshold, the set of containers may be updated via a scale-up event. Similarly, when the current utilization dips below the lower-utilization threshold, the set of containers may be updated via a scale-down event. In some embodiments, a scaling event may include vertically scaling the set of containers (e.g., increasing or decreasing the number of CPU devices allocated for one or more containers of the set of containers). In other embodiments, a scaling event may include horizontally scaling the set of containers (e.g., increasing or decreasing the number of containers included in the set of containers). A scale-up or a scale-down event may include (horizontally or vertically) scaling the set of containers by a specified factor. Thus, each configuration of the set of configurations may be encoded in a 3-tuple: $c_i$=(cpu_num$_i$, scal_lo$_i$, scal_hi$_i$), where the subscript i indicates an integer index over the elements of the set of configurations, e.g., $1 \leq i \leq n$ and n is an unbounded positive integer. The values of cpu_num$_i$, scal_lo$_i$, and scal_hi$_i$ need not be correlated. Accordingly, in some embodiments, the configurations of the set of configurations may be structured in a 3D (three-dimensional) array, and indexed via three independent indices, e.g., $c_{ijk}$=(cpu_num$_i$, scal_lo$_j$, scal_hi$_k$). That is, in the above 3-tuple representation, cpu_num$_i$ may be equivalent to cpu_num$_j$ for some values of i and j, where i≠j. In other embodiments, additional computational resources may be allocated via a configuration of the set of configurations, such as but not limited to memory, graphical processing unit (GPU) cycles, network resources, and the like.

As noted above, a reward (e.g., a reward metric) may be associated with each configuration of the set of configurations. After sufficient utilization data has been acquired for a particular configuration, the container controller may update an estimate for the particular configuration's corresponding reward. In some embodiments, the estimate for a configuration's reward may be updated after a scaling event, or when the controller reconfigures the set of containers. Note that each scaling event may result in a reconfiguration event, because a scaling event results in the value of cpu_num being updated.

As noted above, configuring a set of containers for an IP task is traditionally performed manually or partially automated via heuristics. Besides involving manual labor, such traditional methods often result in the inefficient allocation of resources and/or disruptions in computational services. Because multi-armed bandits (and MDP in general) balance the exploration and exploitation tradeoffs inherent when making decisions under incomplete information (e.g., the set of rewards is unknown and iteratively estimated), the embodiments increase the efficiency when allocating resources for container-based computation. Accordingly, the embodiments inherently improve the performance of computation systems.

Example Operating Environment for Container-Based Computation

FIG. 1 illustrates an enhanced container-based computational system 100 implementing various embodiments presented herein. Computational system 100 is enabled to efficiently and adaptively allocate resources for container-based computations via Markov Decision Processes (MDP). Computational system 100 may include at least a client computing device 102 and a computational resource stack 120, in communication via a communication network 110. The computational resource stack 120 may provide computational services to a user of client computing device 102, via the communication network 110. More particularly, the computational resource stack 120 may include multiple physical and virtualized layers: a physical hardware layer 130, an operating system (OS) layer 150, and a virtualized container layer 160. The physical layer 130 may include physical computational hardware, e.g., a set of physical computing devices 132 (e.g., server computational devices), a set of physical networking devices 134 (e.g., routers and network traffic balancers), and a set of physical storage devices 136 (e.g., magnetic or solid-state storage disks). An OS may be implemented by the physical layer 130 via the OS layer 140. A container controller 150 may implement a set of containers via the container layer 160. The container layer 160 may include a set of (virtualized) containers. Thus, the container layer 160 may be referred throughout as a set of containers 160. The set of containers 160 (e.g., the container layer 160) may include one or more containers: container_1 162, container_2 164, container_3 166, and container_4 168. Note that the embodiment shown in FIG. 1 is non-limiting, and the set of containers 160 may include more or less than four containers. Each container may implement one or more applications. For instance, container_1 162 implements application_1 172 and container_2 implements application_2 174. A single application may be distributed across multiple containers, e.g., application_3 176 is implemented and distributed across container_3 166 and container_4 168. The user of client computing device 102 may interact with any of the applications implemented by the container layer 160 via the communication network 110. Various embodiments of computing devices (e.g., client computing device 102 and the set of physical computing devices 132) are discussed in conjunction with at least computing device 500 of FIG. 5.

Communication network 110 may be a general or specific communication network and may be directly and/or indirectly communicatively coupled to client computing device 102 and server computing device 104. Communication network 110 may be any communication network, including virtually any wired and/or wireless communication technologies, wired and/or wireless communication protocols, and the like. Communication network 110 may be virtually any communication network that communicatively couples a plurality of computing devices and storage devices in such a way as to allow computing devices to exchange information via communication network 110.

Figure 2:
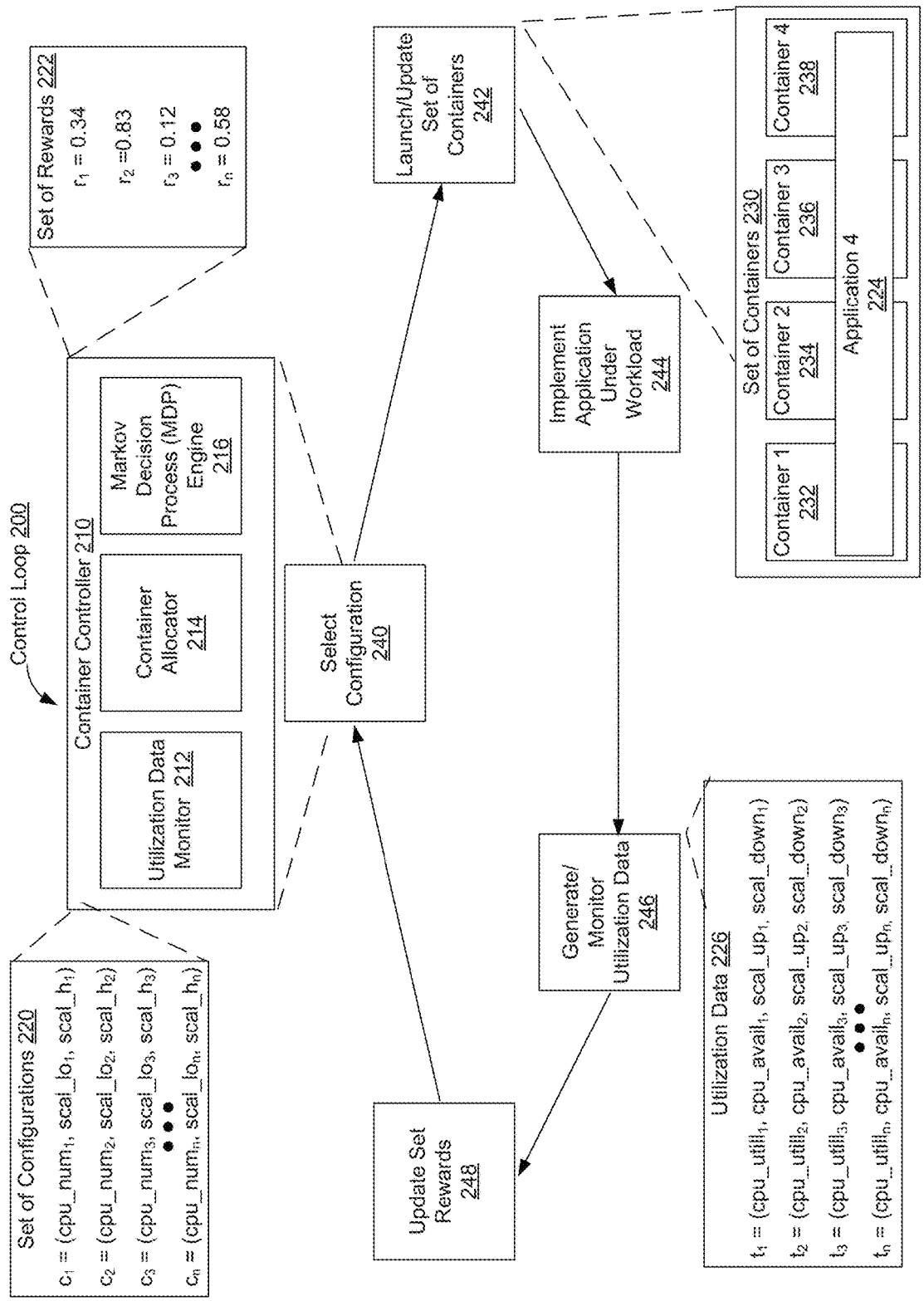
FIG. 2 illustrates a control loop implemented by a container controller 210, in accordance to various embodiments presented herein.

Various embodiments of container controller 150 are discussed in conjunction with at least FIG. 2. However, briefly here, container controller 150 is generally responsible for managing (e.g., configuring, launching, rescaling, reconfiguring, and retiring) the set of containers. The container controller 150 launches and dynamically updates the resource allocation (e.g., indicated by a selected configuration) for the set of containers 160. The container controller 150 may implement an MDP-based control loop to adaptively configure/reconfigure (e.g., allocate resources for) the set of containers 160. In some embodiments, the MDP of the control loop is a single-state MDP (e.g., a multi-armed bandit decision process). In such embodiments, each possible configuration for the set of containers is an arm on the multi-armed bandit. Thus, container controller 150 may implement a multi-arm bandit (MAB) decision process to efficiently and adaptively allocate resources for container-based computation.

FIG. 2 illustrates a control loop 200 implemented by a container controller 210, in accordance with various embodiments presented herein. Container controller 210 may be similar to container controller 150 of system 100. Accordingly, container controller 150 may implement a control loop that is similar to control loop 200 to efficiently and adaptively allocate resources for container-based computation. That is, the container controller 150 and the container controller 210 can manage container-based computation by configuring and reconfiguring a set of containers (e.g., set of containers 160 of FIG. 1 and/or set of containers 230) implementing one or more applications (e.g., application_1 162, application_2 164, application_3 176, and/or application_4 224) under one or more workloads.

To carry out such functionality, container controller 210 may include a utilization data monitor 212, a container allocator 214, and a Markov Decision Process (MDP) engine 216. As noted throughout, in some non-limiting embodiments, the MDP is a single-state multi-armed bandit (MAB) decision process. Accordingly, MDP engine 216 may be an MAB engine. In other embodiments, the MDP engine 216 implements a multi-state MDP decision process. Utilization data monitor 212 is generally responsible for acquiring, monitoring, and analyzing utilization data 226. Container allocator 214 is generally responsible for launching, rescaling, reconfiguring, and retiring one or more sets of containers (e.g., set of containers 160 of FIG. 1 and/or set of containers 230). Each of the one or more sets of containers may include one or more containers implementing one or more applications under one or more workloads. For example, set of containers 230 includes four containers: container_1 232, container_2 234, container_3 236, and container_4 238 implementing a single application_1 224. The embodiment shown in FIG. 2 is non-limiting, and in other embodiments, the set of containers 230 may include more than or less than four containers, and implementing more than a single application. In at least one embodiment, the set of containers 230 may include a single container implementing one or more applications. The MDP engine 216 is generally responsible for selecting a configuration (from set of configurations 220) when the container controller 210 is launching, rescaling, and/or reconfiguring the set of containers 230 via an MDP (e.g., a MAB decision process).

As noted throughout, each configuration of the set of configurations 220 indicates or corresponds to a separate allocation of the computational resources (e.g., resources from the physical hardware layer 130 of the computational resource stack 120 of FIG. 1) for the set of containers 230. Thus, each configuration of the set of configurations may be a candidate (or potential) configuration for the set of containers 230. In some embodiments, each configuration of the set of configurations 220 may indicate the cardinality of the set of containers 230. For instance, a configuration may indicate a number of CPU devices (or cycles) allocated to the set of containers 230, which may scale with the number of containers included in the set of containers 230. The utilization data 226 encodes a utilization of the computational resources that have been allocated to set of containers 220 (as indicated by the configuration selected by MDP engine 216 and implemented by container allocator 214) when the application_1 224 is subjected to a workload. To select a configuration, the MDP engine 216 may employ a set of rewards 222. Each reward of the set of rewards 222 may correspond to, or be associated with, one of the configurations of the set of configurations 220. Thus, there may be a one-to-one correspondence or mapping between the configurations of the set of configurations 220 and the rewards of the set of rewards 222. The MDP engine 216 may iteratively update estimates of the values of the rewards of the set of rewards 222 based on an analysis of the utilization data 226. A reward for a configuration may be a scalar value, normalized to a range of [0.0, 1.0]. A first reward associated with a first configuration that is greater (in value) than a second reward associated with a second configuration may indicate that the set of containers 230 being configured via the first configuration generally utilizes the allocated resources (as indicated by the first configuration) more efficiently than the set of containers 230 being configured via the second configuration would utilize the allocated resources (as indicated by the second configuration) when the application_4 224 is implemented under a workload.

An initiation of control loop 200 may be triggered in response to receiving a request for computational services. For example, client device 102 of FIG. 1 may transmit (via communication network 110) a request to container controller 150 of FIG. 1 and/or container controller 210. The request may be a request to launch set of containers 230 and/or to implement application_4 225 via the set of containers 230. When triggered, a control loop may begin at step 240. At step 240 the MDP engine 216 may select a configuration from the set of configurations 220. During a first iteration around the control loop 200, the configuration selected at step 240 may be an initial configuration for which to launch the set of containers 230 (with the allocated resources indicated by the selected configuration). In subsequent iterations, the configuration launch at step 240 is a configuration for which to update resources allocated to the set of containers 230.

The MDP engine 216 may employ a selection algorithm and the set of rewards 222 to select a configuration from the set of configurations 220. Such selection algorithms may include, but need not be limited to an epsilon-greedy algorithm, a softmax algorithm, an upper confidence bound (UCB) algorithm, Thompson sampling, explore-then-commit, an exponential weight algorithm (e.g., EXP3) for exploration and exploitation, and the like. In some embodiments, the selection algorithm selects a configuration from the set of configurations based on a ranking of the set of reward metrics, an exploration-exploitation balancing policy, and a stochastically determined value. Accordingly, the selection algorithm may first decide whether to exploit the current knowledge of the configuration space (as defined by the current estimates of the rewards of the set of rewards 222) or (randomly or deterministically) explore the configuration space of the set of configurations 220. In some embodiments, the decision whether to explore or exploit may be a stochastic decision (e.g., a non-deterministic decision based on the generation of a random or pseudo number). In other embodiments, the decision whether to explore or exploit may be a deterministic decision.

If the MDP engine 216 determines to exploit, then MDP engine 216 may select the configuration (of the set of configurations 220) based on a ranking of the current estimates of the reward values of the set of rewards 222 (e.g., the configuration associated with the largest reward may be selected to launch the set of containers 230). If the MDP engine 216 determines to explore, then the selection of the configuration may be another deterministic or non-deterministic decision. If the selection of the configuration is stochastic (under the explore mode), the selection of the configuration may be based on a random or pseudo-random number. If the selection of the configuration is deterministic (under the explore mode), the selection of the configuration may be based on the current estimates of the set of rewards 222. For instance, the selection may be based on a current uncertainty or variance associated with each reward of the set of rewards 222. In one embodiment, the reward associated with the greatest uncertainty may be selected as the configuration.

During the initial iteration of control loop 200, at step 242, the set of containers 230 is launched with the allocated resources indicated in the configuration selected at step 240. In subsequent iterations, at step 242, the resources allocated to the set of containers 230 is updated via the configuration selected at step 240. For instance, the set of containers 230 may be updated when a reconfiguring event and/or a scaling event is triggered via the monitoring of utilization data 226. During the first iteration of loop 200, at step 244, an application (e.g., application_4 224) may be implemented. During subsequent iterations, step 244 may be bypassed. The container allocator 214 may be generally responsible for implementing steps 242 and 244.

At step 246, utilization data 246 may be generated, acquired, and/or monitored 256. The utilization data monitor 212 may be generally responsible for implementing step 246. Step 248 may be performed when either a scaling or reconfiguring event is triggered. In some embodiments, utilization data monitor 214 is generally responsible for detecting triggers for a scaling and/or reconfiguration event for the set of containers 230 via an analysis of the utilization data 246. At block 248, the set of rewards may be updated based on the analysis of the utilization data. More particularly, the value (and the uncertainty) of the reward association with the configuration selected at step 240 may be updated (as discussed below) based on the analysis of the utilization data. When a scaling and/or reconfiguration event is triggered, control loop 200 may return to step 240 to select another configuration for the scaling and/or reconfiguration of the set of containers 230.

Although the discussion throughout is directed towards MAB (e.g., single-state MDP) embodiments, it should be understood that the embodiments are not so constrained, and the MDP engine 216 may implement a multi-state MDP. For instance, a plurality of states may be defined for the set of containers 230 (e.g., states characterized by current and/or previous portions of the utilization data), and the set of actions of the MDP may correspond to the set of configurations 220. The selection of a configuration (e.g., an action to perform via the MDP) may be based on the set of containers' 230 current state, and possibly one or more previous states. The performance of an action (e.g., the reconfiguration of the set of containers) may transition the current state of the set of containers to another available state (e.g., an increase or decrease in the utilization of the allocated resources).

In various embodiments, each configuration of the set of configurations 230 may indicate a measure of an amount of CPUs allocated for the set of containers. The measure of the amount of allocated CPUs may be indicated as cpu_num. In some embodiments, cpu_num may indicate a fractional proportion of a container's host machine CPU cycles allocated for utilization by the container (e.g., $0.0 \leq \text{cpu\_num} \leq 1.0$). In other embodiments, cpu_num may be an integer that indicates a number of CPU devices allocated to each container in the set of containers 230. In still other embodiments, cpu_num may be an integer that indicates a total number of CPU devices allocated to the entirety of the set of containers 230. In some embodiments, each container in the set of containers 230 may be allocated an equivalent number of CPU devices. Thus, cpu_num may scale linearly with a cardinality of the set of containers 230. In other embodiments, the number of CPU devices allocated to containers may vary across the containers of the set of containers 230.

Each configuration of the set of configurations 220 may additionally indicate a trigger condition for initiating a scale-up event (e.g., an upper-utilization threshold) for the set of containers 220, as well as a trigger condition for initiating a scale-down event (e.g., a lower-utilization threshold) for the set of containers 220. The upper-utilization threshold may be a high-water mark (hw) and may be indicated as scal_hi. The lower-threshold may be a low-water mark (lw) and may be indicated as scal_lo. In various embodiments, $0.0 \leq \text{scal\_lo} < \text{scal\_hi} \leq 1.0$. As shown in FIG. 2, each configuration of the set of configurations 220 may be encoded in a 3-tuple: $c_i = (\text{cpu\_num}_i, \text{scal\_lo}_i, \text{scal\_hi}_i)$, where the subscript i indicates an integer index over the elements of the set of configurations, e.g., $1 \leq i \leq n$ and n is an unbounded positive integer. The values of $\text{cpu\_num}_i$, $\text{scal\_lo}_i$, and $\text{scal\_hi}_i$ need not be correlated. Accordingly, in some embodiments, the configurations of the set of configurations may be structured in a 3D array and indexed via three independent indices, e.g., $c_{ijk} = (\text{cpu\_num}_i, \text{scal\_lo}_j, \text{scal\_hi}_k)$. That is, in the above 3-tuple representation, $\text{cpu\_num}_i$ may be equivalent to $\text{cpu\_num}_j$ for some values of i and j, where $i \neq j$. In other embodiments, additional computational resources may be allocated via a configuration of the set of configurations, such as but not limited to memory, graphical processing unit (GPU) cycles, network resources, and the like.

As discussed below, the utilization data 226 encodes utilization data, for the set of containers 230 and for the selected configuration, as the application_4 224 is implemented under a workload. The utilization data may be encoded as a time series of n-tuples, where the subscript i serves as a temporal index for the time series. In the non-limiting embodiment shown in FIG. 2, the n-tuples are 4-tuples, with the following tuples: cpu_util, cpu_avail, scal_up, and scal_down. In various embodiments, $\text{cpu\_util}_i$ may indicate a number of CPU devices (or cycles) that the set of containers 230 utilizes during the temporal bin, window, period, or bucket corresponding to the temporal index. In contrast, $\text{cpu\_avail}_i$ may indicate the actual number of CPU devices (or cycles) that are allocated (e.g., that are available) for the set of containers 230 during the temporal bin corresponding to the temporal index. Note that $\text{cpu\_util}_i \leq \text{cpu}_{\text{avail}_i}$ for $\forall i$. Thus, the utilization data encodes a fractional utilization of the allocated resources $$\left(\text{e.g., } 0.0 \leq \text{frac\_util}_i = \frac{\text{cpu\_util}_i}{\text{cpu\_avail}_i} \leq 1.0\right)$$

as a time series. In some embodiments, $\text{cpu\_util}_i$ and/or $\text{cpu\_avail}_i$ may be averaged across the temporal bin. In embodiments where the temporal bin is sufficiently narrow, time averaging may not be necessary because the values are relatively constant across the narrow temporal bin.

Each 4-tuple may additionally indicate a number of scale-up events (e.g., $\text{scal\_up}_i$) for the set of containers 230 and a number of scale-down events (e.g., $\text{scal\_down}_i$) for the set of containers 230 that occurred during the corresponding temporal bin. If the temporal bins are sufficiently narrow, each value of $\text{scal\_up}_i$ and/or $\text{scal\_down}_i$ may be either 0 or 1. A summation or integration over the $\text{scal\_up}_i$ values provide a total number of scale-up events that have occurred during the lifetime (or a subset of the lifetime) of the set of containers 230. Likewise, a summation or integration over the scal_down values provides a total number of scale-down events that have occurred during the lifetime (or a subset of the lifetime) of the set of containers 230. A summation of the total number of scale-up events and the total number of scale-down events (over a time period of sufficient interest) provides a total number of scaling events that occurred during that time period.

When the current utilization (e.g., $\text{frac\_util}_i$) exceeds the upper-utilization threshold (e.g., $\text{scal\_hi}_i$), the set of containers may be updated via a scale-up event. Similarly, when the current utilization dips below the lower-utilization threshold (e.g., scal_lo$_i$), the set of containers may be updated via a scale-down event. In some embodiments, a scaling event may include vertically scaling the set of containers (e.g., increasing or decreasing the number of CPU devices allocated for one or more containers of the set of containers). In other embodiments, a scaling event may include horizontally scaling the set of containers (e.g., increasing or decreasing the number of containers included in the set of containers). A scale-up or a scale-down event may include (horizontally or vertically) scaling the set of containers by a specified factor. Thus, in some embodiments, scale-up event may result in a new configuration with a larger value of cpu_num, and a scale-down event may result in a new configuration with a smaller value of cpu_num.

In general, the value of the reward for a particular configuration is a measure of resource allocation efficiency for the particular configuration. As discussed below, an analysis of the utilization data provides a means for estimating the value of the rewards for the corresponding configurations. Initially, the values for the rewards may be unknown. Accordingly, a value may be assigned to each reward. The initially assigned reward for each configuration may be arbitrary. In some embodiments, the initially assigned rewards may be uniform across the set of rewards 222. In other embodiments, the initial rewards may be assigned randomly. In at least one embodiment, one or more heuristics may be employed to initially assign the values to the rewards. As utilization data is collected for a configuration, the estimate for the corresponding reward is updated. As the estimated reward for the configuration is iteratively updated (via loop 200), the confidence in the estimated value is decreased and the estimated reward value convergences its "true" value (e.g., the value that would be estimated from an infinite stream of utilization data for the configuration).

If the utilization of the resources allocated for the set of containers 230 (as indicated by the particular configuration) is relatively efficient, then the reward for the particular configuration should be relatively high. In contrast, if the utilization of the resources allocated for the set of containers 230 is relatively inefficient, then the reward for the particular configuration should be relatively low. That is, configurations that trend towards greater efficiency in the utilization of allocated resources should be preferred over configurations that trend towards lower efficiency in the utilization of allocated resources. Accordingly, the calculation of a reward value should assign larger rewards to the configurations that trend towards greater efficiency in resource utilization. In the non-limiting embodiments discussed herein, the reward calculation depends upon two factors: a resource wastage factor and an overhead factor. For the resource wastage factor, configurations with more resource wastage should have a lesser reward than configurations with lesser resource wastage. In some embodiments, the resource being wasted may be CPU devices (or cycles). Other embodiments may consider additional and/or alternative allocated resources (e.g., memory, storage volumes, and the like) that may be wasted. The overhead factor is a measure of how much system overhead interferes with the computation services. In the embodiments discussed below, the overhead factor scales with the number of scaling events, since scaling events are disruptive to the computational services being provided.

More specifically, in regards to the resource wastage factor, the current utilization (e.g., frac_util$_i$) is a measure of the resource wastage across the corresponding temporal bin. If frac_util$_i$=1.0, then no allocated resources are being wasted, while if frac_util$_i$=0.0, then all the allocated resources are being wasted across the temporal bin. The reward for a particular configuration should accordingly be updated based on the current utilization, where the reward is increased for higher current utilizations and decreased for lower utilizations.

With regards to the overhead factor, scaling events may be disruptive to the computational services being provided, and thus the rewards should be updated based on the total number of scaling events. For example, the rewards should be adjusted downward when large numbers of scaling events are triggered, and the rewards should be adjusted downwards when smaller numbers of scaling events are triggered. In at least one embodiment, the reward ($f_i$) for a configuration may be calculated as a time series (or a function of time) based on an analysis of the utilization data 226 as indicated below. A linear combination of two components is considered in the below formulation: $\tilde{w}_i$ is a resource wastage factor (e.g., wasted CPU devices and/or cycles), and $\tilde{s}_i$ is an overhead factor (e.g., system overhead associated with scaling events), where $\omega_{waste}$ and $\omega_{overhead}$ are the associated linear weights of a linear combination of the two factors. Also, in the below formulation, $w_i$=(cpu_avail$_i$−cpu_num$_i$), $w_{max}$=max($w_i|\forall i$), and $w_{min}$=min($w_i|\forall i$). Likewise, $s_i$=number of scaling events (e.g., scal_up$_i$+scal_down$_i$ integrated across the temporal bins), $s_{max}$=max($s|\forall i$), and $s_{min}$=min($s_i|\forall i$). In one embodiment, a time series of the reward function for a configuration may be calculated as follows:

$$f_i = \frac{1}{\omega_{waste} * \tilde{w}_i + \omega_{overhead} * \tilde{s}_i}, \text{ where}$$

$$\tilde{w}_i = \frac{w_i - w_{min}}{w_{max} - w_{min}}, \text{ and}$$

$$\tilde{s}_i = \frac{s_i - s_{min}}{s_{max} - s_{min}}.$$

The utilization data monitor 212 may analyze the utilization data 226 to calculate the estimated value of the reward (of the set of rewards 222) corresponding to the configuration (of the set of configurations 220). At step 248 of the control loop 200, the rewards for the configuration may be updated based on the calculation of $f_i$. In various embodiments, the estimated value may be updated based on an averaging of the time series for $f_i$. As noted above, the triggering of a scaling event or a reconfiguration event may result in the update of the set of rewards at step 248, and a return to step 240 to select another configuration for the scaling and/or reconfiguration of the set of containers 230. The selection of the configuration may be based on the updated set of rewards 222 and one or more selection algorithms, such as but not limited to a an epsilon-greedy algorithm, a softmax algorithm, an upper confidence bound (UCB) algorithm, Thompson sampling, explore-then-commit, an exponential weight algorithm (e.g., EXP3) for exploration and exploitation, and the like. In some embodiments, the selection algorithm selects a configuration from the set of configurations based on a ranking of the set of reward metrics, an exploration-exploitation balancing policy, and a stochastically determined value.

Figure 3:
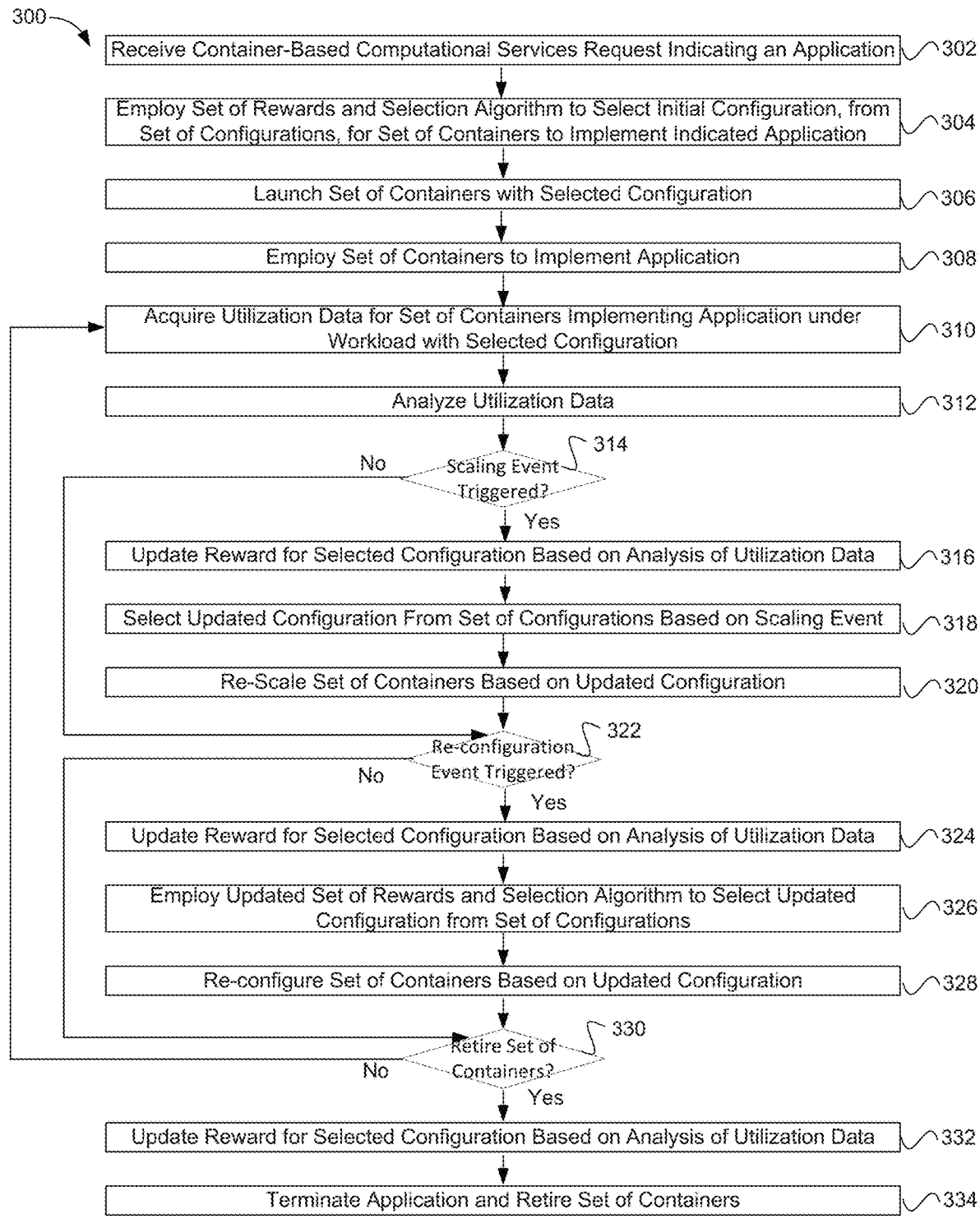
FIG. 3 illustrates one embodiment of a method for the efficient and adaptive allocation of resources for container-based computation via Markov Decision Processes.
Figure 4:
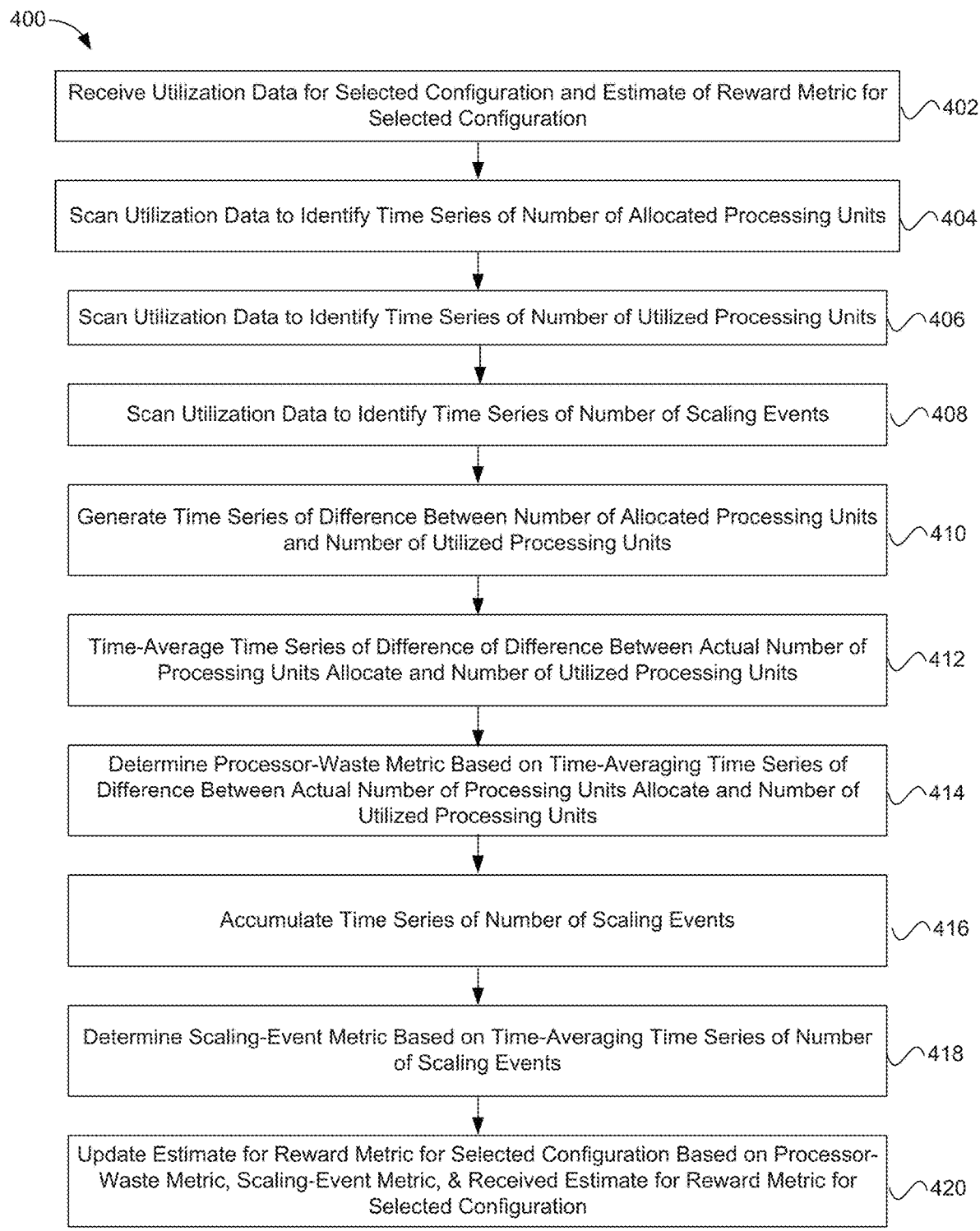
FIG. 4 illustrates one embodiment of a method for analyzing utilization data.
Figure 5:
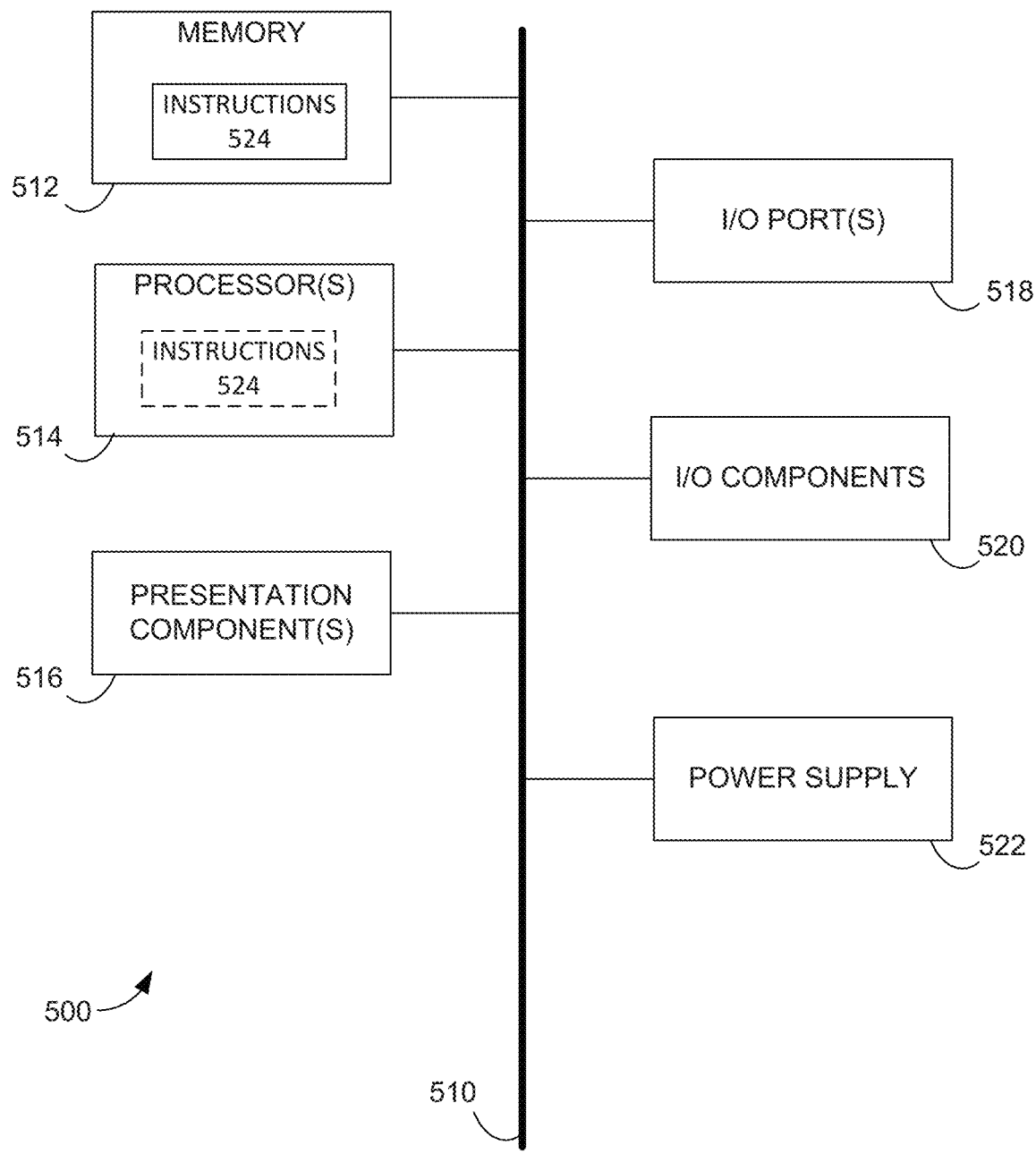
FIG. 5 is a block diagram of an example computing device in which embodiments of the present disclosure may be employed.

Generalized Processes for Configuration of Resources for Container-Based Computation Processes 300-400 of FIGS. 3-4, or portions thereof, may be performed and/or executed by any computing device, such as but not limited to, client computing device 102 of FIG. 1, any of the physical computing devices of the set of physical computing devices 132 of FIG. 1, and/or computing device 500 of FIG. 5. Additionally, container controller, such as but not limited to container controller 150 of FIG. 1 or container controller 210 of FIG. 2, may perform and/or execute at least portions of process 300-400.

FIG. 3 illustrates one embodiment of a method 200 for the efficient and adaptive allocation of resources for container-based computation via Markov Decision Processes (MDP). Process 300 may be performed by a container controller, such as but not limited to container controller 150 of FIG. 1 and/or container controller 210 of FIG. 2. For example, to enable control loop 200 of FIG. 2, container controller 210 may implement at least portions of method 300 (as well as method 400 of FIG. 4). Process 300 begins at block 302, where a request is received. The request may be a request to initiate or launch container-based computational services. The request may indicate an application (e.g., application 224 of FIG. 2) to be implemented via a set of containers (e.g., set of containers 230 of FIG. 2) that includes one or more containers. The request may be transmitted by a client device (client computing device 102 of FIG. 1). The request may be received at one or more layers of a computational stack (e.g., computational stack 120 of FIG. 1). The request may be received by a container controller implemented by the computational stack.

At block 304, a set of rewards (e.g., set of rewards 222 of FIG. 2) and a selection algorithm may be employed to select an initial configuration from a set of configurations (e.g., set of configurations 220 of FIG. 2) to implement the selected configuration. Each configuration of the set of configurations corresponds to a candidate allocation of the computational resources for the set of containers. In various embodiments, each configuration of the set of configurations includes and/or indicates an initial number of processing devices (or cycles) of the computing resources that are provided to (or allocated for) the set of containers when the set of containers is launched, rescaled, and/or reconfigured. In some embodiments, each configuration of the set of configurations includes and/or indicates a lower-utilization threshold indicating a first condition that triggers a scale-up event for the first set of containers when implementing the application under the first workload. In at least one embodiment, each configuration of the set of configurations includes and/or indicates an upper-utilization threshold indicating a second condition that triggers a scale-down event for the first set of containers when implementing the application under the first workload.

The selection algorithm may include, but is not limited to, an epsilon-greedy algorithm, a softmax algorithm, an upper confidence bound (UCB) algorithm, Thompson sampling, explore-then-commit, an exponential weight algorithm (e.g., EXP3) for exploration and exploitation, and the like. In various embodiments, the selection algorithm may include any combination of an epsilon-greedy algorithm, a Boltzmann exploration algorithm, an upper confidence bounds (UCB) algorithm, Thompson sampling, explore-then-commit, or an exponential weight algorithm for exploration and exploitation. In some embodiments, the selection algorithm selects a configuration from the set of configurations based on a ranking of the set of reward metrics, an exploration-exploitation balancing policy, and a stochastically determined value. In various embodiments, the selection of the configuration is made via an MDP process, where the set of rewards is the set of rewards of the MDP process. In some embodiments, an MDP engine (e.g., MDP engine 216 of FIG. 2) may be employed to select the initial configuration of the set of configurations. In at least some embodiments, the MDP process is a state-independent (or single-state) MDP process, such as a multi-armed bandit (MAB) decision process. In such embodiments, each configuration of the set of configurations corresponds to a separate arm of the multi-arms. The set of rewards may be a set of reward metrics. Each reward (metric) of the set of rewards (or reward metrics) corresponds to a separate configuration of the set of configurations. There may be a one-to-one mapping between the configurations of the set of configurations and the rewards of the set of rewards. Each reward of the set of rewards may indicate a computational resource allocation efficiency associated with the corresponding configuration. Accordingly, the set of rewards may indicate computational resource allocation efficiencies associated with the set of configurations.

At block 306, the set of containers is launched with the initially selected configuration. A container allocator (e.g., container allocator 214 of FIG. 2) may launch the set of containers. For example, each of the containers in the set of containers may be "spun up" in a container layer (e.g., container layer 160 of FIG. 1) of a computational stack (e.g., computational stack 120 of FIG. 1). At block 308, the set of containers is employed to deploy and/or implement the application. For instance, the set of containers may implement the application under a workload.

At block 310, utilization data (e.g., utilization data 226 of FIG. 2) is acquired for the set of containers implanting the application under the workload with the selected configuration. The utilization data may encode a utilization of the allocation of the computational resources corresponding to the selected configuration when the set of containers implements the application under the workload. At block 312, the utilization data is monitored and/or analyzed. A utilization data monitor (e.g., utilization data monitor 212 of FIG. 2) may acquire, monitor, and/or analyze the utilization data. Various embodiments of analyzing utilization data are discussed at least in conjunction with method 400 of FIG. 4. The analysis of the utilization data may be enabled to detect one or more triggers for a scaling event for the set of containers implementing the application under the workload. Such scaling triggers include triggers for scale-up events, as well as triggers for scale-down events. The scale-up events may include increasing a cardinality of the set of containers when the set of containers implements the application under the workload. The scale-down events may include decreasing the cardinality of the set of containers when the set of containers implements the application under the workload. Such scaling events may result in horizontal and/or vertical scaling of the set of containers. Such scaling events may result in reconfiguring the set of containers. The analysis of the utilization data may be enabled to detect one or more triggers for a reconfiguration event of the set of containers. Note that a scaling event is one type of re-configuration event, but the embodiments may include additional reconfiguration events.

At decision block 314, it is determined whether a scaling event has been triggered via the analysis of the utilization data at block 312. If a scaling event has been triggered, method 300 may flow to block 316. Otherwise, if a scaling event has not been triggered, the method 300 flows to decision block 322. At block 316, the set of rewards may be updated. More specifically, the reward (of the set of rewards) corresponding to the selected configuration (of the set of configurations) may be updated based on the analysis of the utilization data. Various embodiments for updating a reward based on the utilization data for the reward are discussed at least in conjunction with the control loop 200 of FIG. 2 and method 400 of FIG. 4. At block 318, and in response to identifying and/or detecting a scaling event (triggered in the analysis of the utilization data), an updated configuration is selected from the set of configurations. The updated configuration may be selected based on the scaling event (e.g., based on whether the scaling event is a scale-up event or a scale-down event and/or a scaling factor). In some embodiments, the updated configuration may be based on an MDP (e.g., a MAB decision process) based on the set of rewards and the selection algorithm. Thus, the updated set of rewards and the selection algorithm may be employed to select an updated configuration from the set of configurations. An MDP engine may select the updated configuration. At block 320, the set of containers may be rescaled based on the updated configuration.

At decision block 322, it is determined whether a reconfiguration event has been triggered via the analysis of the utilization data at block 312. If a reconfiguration block has been triggered, then method 300 flows to block 324. Otherwise, if a reconfiguration event has not been triggered based on the analysis of the utilization data, then method 300 may flow to decision block 320.

At block 324, the set of rewards is updated based on the analysis of the utilization data. More specifically, the reward (of the set of rewards) corresponding to the selected configuration (of the set of configurations) may be updated based on the analysis of the utilization data. Various embodiments for updating a reward based on the utilization data for the reward are discussed at least in conjunction with the control loop 200 of FIG. 2 and method 400 of FIG. 4. At block 326, and in response to identifying and/or detecting (via the analysis of the utilization data) a triggered reconfiguration event, the updated set of rewards and a selection algorithm may be employed to select an updated configuration from the set of configurations. An MDP may be employed to select the updated configuration. An MDP engine may make the selection of the updated configuration. The MDP may be a MAB decision process that employs the updated set of rewards and the selection algorithm. The MDP may balance the exploration and exploitation of the configuration space of the set of configurations. At block 328, the set of containers may be reconfigured based on the updated configuration. A container allocator may reconfigure the set of containers using the updated configuration.

At decision block 330, it is determined whether to retire the set of containers. For example, a sender of the request (of block 302) may send a request to terminate the computation services. If the set of containers is to be retired, then method 300 flows to block 332. If the set of containers is not to be retired, then method 300 may return to block 310 to acquire additional utilization data.

At block 332, the set of rewards is updated based on the analysis of the utilization data. More specifically, the reward (of the set of rewards) corresponding to the selected configuration (of the set of configurations) may be updated based on the analysis of the utilization data. Various embodiments for updating a rewards based on the utilization data for the reward are discussed at least in conjunction with the control loop 200 of FIG. 2 and method 400 of FIG. 4. At block 334, the application may be terminated and the set of containers may be updated. Method 300 may terminate after terminating the application and retiring (e.g., "spinning down" or de-allocating) the set of containers.

In various embodiments, the set of rewards iteratively calculated via the loop of method 300 may be subsequently employed when launching another (e.g., a second) set of containers to implement the application (or a similar application). That is, method 300 may exploit the iteratively determined set of rewards to launch, rescale, and/or reconfigure a second set of containers. For instance, when launching a second set of containers, the MDP may be employed to select another (e.g., a second) configuration from the set of configurations based on the updated set of rewards and the selection algorithm. The second set of containers may be launched with the second configuration. Upon launching the second set of containers, additional utilization for the second set of containers (and for the second configuration) may be acquired. Similar to the first set of containers, additional utilization data may be acquired and analyzed for the second set of containers. The set of rewards may be iteratively updated based on the analysis of the utilization data. A third set of containers may be launched via method 300 and the iteratively updated set of rewards.

FIG. 4 illustrates one embodiment of a method 400 for analyzing utilization data. Process 400 may be performed by a container controller, such as but not limited to container controller 150 of FIG. 1 and/or container controller 210 of FIG. 2. For example, to enable control loop 200 of FIG. 2, container controller 210 may implement at least portions of method 400. Process 400 begins at block 402, where utilization data (e.g., utilization data 220 of FIG. 2) for a selected configuration for a set of containers (e.g., set of containers 230 of FIG. 2) for the set of containers is received. The set of rewards (e.g., set of rewards 222 of FIG. 2) may also be received at block 402. The utilization data may be received by a utilization data monitor (e.g., utilization data monitor 212 of FIG. 2). The utilization data may have been iteratively acquired and the set of rewards may have been iteratively estimated via method 300 of FIG. 3 (e.g., see blocks 310, 316, 324, and/or 332 of method 300). As such, the utilization data may encode an actual number of processing units (and/or cycles) of the computing resources that are provided to (or allocated for) the set of containers when the set of containers implements the application under the workload. The utilization data may encode a time series of a number of processing devices (and/or cycles) that the set of containers utilizes when implementing the application under the workload. In at least one embodiment, the utilization data encodes a time series of a number of scaling events for the set of containers when implementing the application under the workload. The number of scaling events may include a combination of a number of the scale-up events and a number of scale-down events for the set of containers when implementing the application under the workload.

At block 404, the utilization data may be scanned to identify and/or detect the time series of the number of allocated processing units (and/or cycles). At block 406, the utilization data may be scanned to identify and/or detect the time series of the number of utilized processing units (and/or cycles). At block 408, the utilization data may be scanned to identify and/or detect the time series of the number of scaling events. The utilization data monitor may be employed to scan the utilization data to identify the various time series.

At block 410, a time series of a difference between the number of allocated processing units (and/or cycles) and the number of utilized processing units (and/or cycles) is generated. That is, at block 410, a time series of a difference between the actual number of processing units that are provided to the set of containers when implementing the application under the workload and the number of processing devices that the set of containers utilizes when implementing the application under the workload may be generated. At block 412, the time series of the difference between the number of allocated processing units and the number of utilized processing units may be accumulated, summed, integrated, and/or time-averaged. At block 414, a processor-waste metric may be determined. The processor-waste metric may be based on the accumulated, summed, integrated, and/or time-averaged time series of the difference between the number of allocated processing units and the number of utilized processing units. Thus, in some embodiments, a processor-waste metric may be determined based on a summation of the time series of the difference between the actual number of processing units that are provided to the set of containers when implementing the application under the workload and the number of processing devices that the set of containers utilizes when implementing the application under the workload. Determining the processor-waste metric may include calculating a resource wastage metric. Accordingly, determining the processor-waste metric may include determining and/or may be equivalent to $\tilde{w}_i$ and/or a summed or time-averaged value of $\tilde{w}_i$ as described above.

At block 416, the time series of the number of scaling events may be accumulated, summed, integrated, and/or time-averaged. At block 418, a scaling-event metric may be determined. The scaling-event metric may be based on the accumulated, summed, integrated, and/or time-averaged value of the time series of the number of scaling events. Thus, at block 418, a scaling-event metric may be determined based on a summation of the time series of the number of scaling events for the set of containers when implementing the application under the workload. Determining the scaling-event metric may include calculating an overhead metric. Accordingly, determining the scaling-event metric may include determining and/or may be equivalent to $\tilde{s}_i$ and/or a summed or time-averaged value of $\tilde{s}_i$ as described above.

At block 420, an estimate for the reward metric for the selected configuration may be updated. That is, a value for an updated reward metric (corresponding to the selected configuration) may be determined, and the reward may be updated to be equivalent to the updated value. In various embodiments, a value for the updated reward metric may be based on the processor-waste metric. A value for the updated first reward metric may be based on the scaling-event metric. In various embodiments, the updated estimate of the reward metric for the selected configuration may be based on the processor-waste metric, the scaling-event metric, and the received estimate for the reward metric for the selected configuration. In various embodiments, the updated estimate for the reward metric may include determining and/or may be equivalent to as discussed above. Accordingly, the value of the updated reward metric may be based on an inverse of a weighted linear combination of a resource-waste metric and a scaling-event metric that is determined via the analysis of the utilization data.

OTHER EMBODIMENTS

The technology described herein is directed towards enhanced methods and systems for the efficient and adaptive allocation of resources for container-based computation via Markov Decision Processes (MDP). In at least some embodiments, the MDP is state-independent (or a single-state) MDP. Thus, in these non-limiting embodiments, the MDP may be a multi-armed banded (MAB) decision process. One non-limiting embodiment method is for implementing an application (via a first set of containers) under a first workload. The method may include acquiring utilization data for the first set of containers. The first set of containers may have been launched with a first configuration of a set of configurations, or at least the first set of containers is currently configured with the first configuration. For example, the first set of containers may have been launched with different configurations, but has been reconfigured and/or rescaled with the first configuration since the initial launching of the first set of containers with the different configuration of the set of configurations. Each configuration of the set of configurations may correspond to a candidate allocation of the computational resources for the first set of containers. A set of rewards (or reward metrics) may indicate computational resource allocation efficiencies associated with the set of configurations (as measured via encodings of the utilization data). The method may include updating the set of rewards based on an analysis of the acquired utilization data. Each reward metric of the set of reward metrics may correspond to a separate configuration of the set of configurations. Updating the set of reward metrics may include updating a first reward metric of the set of reward metrics. The first reward metric may correspond to the first configuration. Updating the first reward may be based on an analysis of the utilization data. The utilization data may encode a utilization of a first allocation of the computational resources. The first allocation may correspond to the first configuration, when the first set of the container implements the application under the first workload. A second configuration of the set of configurations may be selected. The selection of the second configuration may be based on a selection algorithm and the updated set of reward metrics. A second set of containers may be launched with the second configuration. In other embodiments, the first set of containers may be reconfigured with the second configuration. In at least one embodiment, the first and second configurations are the same configuration of the set of configurations.

In various embodiments, the method may further include acquiring additional utilization data for the second set of containers. The additional utilization data may encode a utilization of a second allocation of the computational resources. The second allocation may correspond to the second configuration when the second set of containers implements the application under a second workload. The set of reward metrics may be updated. Updating the set of reward metrics may including updating a second reward metric of the set of reward metrics. The second reward metric may correspond to the second configuration. Updating the second reward metric may be based on an analysis of the additional utilization data. A third configuration of the set of configurations may be selected. The selection of the third configuration may be based on the selection algorithm and the updated set of reward metrics. A third set of containers may be launched with the third configuration. In other embodiments, the first or the second set of containers may be reconfigured with the third configuration. In at least one embodiment, the third configuration may be the same configuration as at least one of the first or second configurations of the set of configurations.

In various embodiments, each configuration of the set of configurations may include (or at least indicate) an initial number of processing devices (and/or cycles) of the computing resources that are initially provided to the first set of containers when the first set of containers implements the application under the first workload. The utilization data may encode a time series of an actual number of processing units of the computing resources that are provided to the first set of containers when the first set of containers implements the application under the first workload. The utilization data may further encode a time series of a number of processing devices that the first set of containers utilizes when the first set of containers implements the application under the first workload. In various embodiments, the analysis of the utilization data may include generating a time series of a difference between the actual number of processing units that are provided to the first set of containers when the first set of containers implements the application under the first workload and the number of processing devices that the first set of containers utilizes when the first set of containers implements the application under the first workload. A processor-waste metric may be determined and/or calculated. The determination of the processor-waste metric may be based on an accumulation, summation, integration, and/or time averaging of the time series of the difference between the actual number of processing units that are provided to the first set of containers when the first set of containers implements the application under the first workload and the number of processing devices that the first set of containers utilizes when the first set of containers implements the application under the first workload. A value for the updated first reward metric may be determined based on the processor-waste metric.

In various embodiments, each configuration of the set of configurations includes (or at least indicates) a lower-utilization threshold indicating a first condition that triggers a scale-up event for the set of containers when the first set of containers implements the application under the first workload. Each configuration of the set of containers may additionally include (or at least indicate) an upper-utilization threshold indicating a second condition that triggers a scale-down event for the first set of containers when the first set of containers implements the application under the first workload. The utilization data may encode a time series of a number of scaling events for the first set of containers when the first set of containers implements the application under the first workload. The time series of the number of scaling events may include a combination of a number of the scale-up events for the first set of containers when the first set of containers implements the application under the first workload and a number of the scale-down events for the first set of containers when the first set of containers implements the application under the first workload. The analysis of the utilization data may include determining a scaling-event metric. Determining the scaling-event metric may be based on an accumulation, summation, integration, and/or time averaging of the time series of the number of scaling events for the first set of containers when the first set of containers implements the application under the first workload. The analysis of the utilization data may further include determining a value for the updated first reward metric based on the scaling-event metric.

In some embodiments, the scale-up events include increasing a cardinality of the first set of containers when the first set of containers implements the application under the first workload. Similarly, the scale-down events may include decreasing the cardinality of the first set of containers when the first set of containers implements the application under the first workload. The selection algorithm may include at least one of an epsilon-greedy algorithm, a Boltzmann exploration algorithm, an upper confidence bounds (UCB) algorithm, Thompson sampling, explore-then-commit, or an exponential weight algorithm (e.g., EXP3) for exploration and exploitation. A value of the updated first reward metric may be based on an inverse of a weighted linear combination of a resource-waste metric and a scaling-event metric that are determined via the analysis of the utilization data. The selection algorithm may select the second configuration from the set of configurations based on at least one of a ranking of the updated set of reward metrics, an exploration-exploitation balancing policy, and a stochastically determined value.

Illustrative Computing Device

Having described embodiments of the present invention, an example operating environment in which embodiments of the present invention may be implemented is described below in order to provide a general context for various aspects of the present invention. Referring to FIG. 5, an illustrative operating environment for implementing embodiments of the present invention is shown and designated generally as computing device 500. Computing device 500 is but one example of a suitable computing environment and is not intended to suggest any limitation as to the scope of use or functionality of the invention, and nor should the computing device 500 be interpreted as having any dependency or requirement relating to any one or combination of components illustrated.

Embodiments of the invention may be described in the general context of computer code or machine-useable instructions, including computer-executable instructions such as program modules, being executed by a computer or other machine, such as a smartphone or other handheld device. Generally, program modules, or engines, including routines, programs, objects, components, data structures, etc., refer to code that perform particular tasks or implement particular abstract data types. Embodiments of the invention may be practiced in a variety of system configurations, including handheld devices, consumer electronics, general-purpose computers, more specialized computing devices, etc. Embodiments of the invention may also be practiced in distributed computing environments where tasks are performed by remote-processing devices that are linked through a communications network.

With reference to FIG. 5, computing device 500 includes a bus 510 that directly or indirectly couples the following devices: memory 512, one or more processors 514, one or more presentation components 516, input/output ports 518, input/output components 520, and an illustrative power supply 522. Bus 510 represents what may be one or more buses (such as an address bus, data bus, or combination thereof). Although the various blocks of FIG. 5 are shown with clearly delineated lines for the sake of clarity, in reality, such delineations are not so clear and these lines may overlap. For example, one may consider a presentation component such as a display device to be an I/O component as well. Also, processors generally have memory in the form of cache. Such is the nature of the art, and it is reiterated that the diagram of FIG. 5 is merely illustrative of an example computing device that can be used in connection with one or more embodiments of the present disclosure. Distinction is not made between such categories as "workstation," "server," "laptop," "handheld device," etc., as all are contemplated within the scope of FIG. 5 and with reference to "computing device."

Computing device 500 typically includes a variety of computer-readable media. Computer-readable media can be any available media that can be accessed by computing device 500 and includes both volatile and non-volatile media, removable and non-removable media. By way of example, and not limitation, computer-readable media may comprise computer storage media and communication media.

Computer storage media include volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium that can be used to store the desired information and which can be accessed by computing device 500. Computer storage media excludes signals per se.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 512 includes computer storage media in the form of volatile and/or non-volatile memory. Memory 512 may be non-transitory memory. As depicted, memory 512 includes instructions 524. Instructions 524, when executed by processor(s) 514, are configured to cause the computing device to perform any of the operations described herein, in reference to the above discussed figures, or to implement any program modules described herein. The memory may be removable, non-removable, or a combination thereof. Illustrative hardware devices include solid-state memory, hard drives, optical-disc drives, etc. Computing device 500 includes one or more processors that read data from various entities such as memory 512 or I/O components 520. Presentation component(s) 516 present data indications to a user or other device. Illustrative presentation components include a display device, speaker, printing component, vibrating component, etc.

I/O ports 518 allow computing device 500 to be logically coupled to other devices including I/O components 520, some of which may be built-in. Illustrative components include a microphone, joystick, game pad, satellite dish, scanner, printer, wireless device, etc.

Embodiments presented herein have been described in relation to particular embodiments which are intended in all respects to be illustrative rather than restrictive. Alternative embodiments will become apparent to those of ordinary skill in the art to which the present disclosure pertains without departing from its scope.

From the foregoing, it will be seen that this disclosure is one well-adapted to attain all the ends and objects hereinabove set forth together with other advantages which are obvious and which are inherent to the structure.

It will be understood that certain features and subcombinations are of utility and may be employed without reference to other features or subcombinations. This is contemplated by and is within the scope of the claims.

In the preceding detailed description, reference is made to the accompanying drawings which form a part hereof wherein like numerals designate like parts throughout, and in which is shown, by way of illustration, embodiments that may be practiced. It is to be understood that other embodiments may be utilized, and structural or logical changes may be made without departing from the scope of the present disclosure. Therefore, the preceding detailed description is not to be taken in a limiting sense, and the scope of embodiments is defined by the appended claims and their equivalents.

Various aspects of the illustrative embodiments have been described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features have been omitted or simplified in order not to obscure the illustrative embodiments.

Various operations have been described as multiple discrete operations, in turn, in a manner that is most helpful in understanding the illustrative embodiments; however, the order of description should not be construed as to imply that these operations are necessarily order-dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules may be merged, broken into further sub-parts, and/or omitted.

The phrase "in one embodiment" or "in an embodiment" is used repeatedly. The phrase generally does not refer to the same embodiment; however, it may. The terms "comprising," "having," and "including" are synonymous, unless the context dictates otherwise. The phrase "A/B" means "A or B." The phrase "A and/or B" means "(A), (B), or (A and B)." The phrase "at least one of A, B, and C" means "(A), (B), (C), (A and B), (A and C), (B and C) or (A, B and C)."

What is claimed is:

1. A non-transitory computer-readable storage medium having instructions stored thereon for implementing an application under a first workload, which, when executed by a processor of a computing device cause the computing device to perform actions comprising:
    acquiring utilization data for a first set of containers that was launched with a first configuration of a set of configurations, wherein each configuration of the set of configurations corresponds to a candidate allocation of the computational resources for the first set of containers;
    updating a set of reward metrics that indicate computational resource allocation efficiencies associated with the set of configurations, wherein each reward metric of the set of reward metrics corresponds to a separate configuration of the set of configurations and updating the set of rewards metrics includes updating a first reward metric of the set of reward metrics, corresponding to the first configuration, based on an analysis of the utilization data;
    selecting a second configuration of the set of configurations based on a selection algorithm and the updated set of reward metrics, wherein the selection algorithm employs a Markov Decision Process (MDP) and each configuration corresponds to a separate arm of a multi-arm bandit (MAB) decision process and the selection algorithm is configured to determine whether to exploit the set of configurations and determine whether to explore the set of configurations using a stochastic or deterministic method when performing the selection, wherein:
when determining to exploit the set of configurations, the second configuration is selected based on a ranking of the updated set of reward metrics, and
when determining to explore the set of configurations, the second configuration is selected based on a current uncertainty or variance of a corresponding reward metric; and
launching a second set of containers with the second configuration.

2. The computer-readable storage medium of claim 1, wherein the utilization data encodes a utilization of a first allocation of the computational resources, corresponding to the first configuration, when the first set of the container implements the application under the first workload and the actions further comprise:
acquiring additional utilization data for the second set of containers that encodes a utilization of a second allocation of the computational resources, corresponding to the second configuration, when the second set of containers implements the application under a second workload;
updating the set of reward metrics, including updating a second reward metric of the set of reward metrics, corresponding to the second configuration, based on an analysis of the additional utilization data;
selecting a third configuration of the set of configurations based on the selection algorithm and the updated set of reward metrics; and
launching a third set of containers with the third configuration.

3. The computer-readable storage medium of claim 1, wherein each configuration of the set of configurations includes an initial number of processing devices of the computing resources that are initially provided to the first set of containers when implementing the application under the first workload and the utilization data further encodes:
a time series of an actual number of processing units of the computing resources that are provided to the first set of containers when implementing the application under the first workload; and
a time series of a number of processing devices that the first set of containers utilize when implementing the application under the first workload.

4. The computer-readable storage medium of claim 3, wherein the analysis of the utilization data comprises:
generating a time series of a difference between the actual number of processing units that are provided to the first set of containers when implementing the application under the first workload and the number of processing devices that the first set of containers utilizes when implementing the application under the first workload;
determining a processor-waste metric based on a summation of the time series of the difference between the actual number of processing units that are provided to the first set of containers when implementing the application under the first workload and the number of processing devices that the first set of containers utilizes when implementing the application under the first workload; and determining a value for the updated first reward metric based on the processor-waste metric.

5. The one or more computer-readable storage media of claim 1, wherein each configuration of the set of configurations includes a lower-utilization threshold indicating a first condition that triggers a scale-up event for the first set of containers when implementing the application under the first workload and an upper-utilization threshold indicating a second condition that triggers a scale-down event for the first set of containers when implementing the application under the first workload, and the utilization data encodes:
a time series of a number of scaling events for the first set of containers when implementing the application under the first workload that includes a combination of a number of the scale-up events for the first set of containers when implementing the application under the first workload and a number of the scale-down events for the first set of containers when implementing the application under the first workload.

6. The one or more computer-readable storage media of claim 5, wherein the analysis of the utilization data comprises:
determining a scaling-event metric based on a summation of the time series of the number of scaling events for the first set of containers when implementing the application under the first workload; and
determining a value for the updated first reward metric based on the scaling-event metric.

7. The one or more computer-readable storage media of claim 5, wherein the scale-up events include increasing a cardinality of the first set of containers when implementing the application under the first workload and the scale-down events include decreasing the cardinality of the first set of containers when implementing the application under the first workload.

8. The one or more computer-readable storage media of claim 1, wherein a value of the updated first reward metric is based on an inverse of a weighted linear combination of a resource-waste metric and a scaling-event metric that is determined via the analysis of the utilization data.

9. The one or more computer-readable storage media of claim 1, wherein the selection algorithm selects the second configuration from the set of configurations based on the ranking of the updated set of reward metrics, an exploration-exploitation balancing policy, and a stochastically-determined value.

10. The computer-readable storage medium of claim 1, wherein there is a one-to-one correspondence between the configurations of the set of configurations and the reward metrics of the set of reward metrics.

11. A computer-implemented method for managing computational resources for a container implementing an application under a workload, the method comprising:
generating an analysis of utilization data for the container that was configured with a first configuration of a set of configurations, wherein each configuration of the set of configurations corresponds to a separate allocation of the computational resources for the container, and each configuration corresponds to a separate arm of a multi-arm bandit (MAB) decision process;
based on the analysis of the utilization data, updating a set of reward metrics corresponding to the set of configurations, wherein each reward metric of the set of reward metrics corresponds to a separate configuration of the set of configurations and updating the set of rewards metrics includes updating a first reward metric of the set of reward metrics, corresponding to the first configuration;

employing a selection algorithm as part of a Markov Decision Process (MDP) to select a second configuration of the set of configurations based on the updated set of reward metrics, wherein the selection by the selection algorithm determines between exploiting the updated set of reward metrics and exploring the set of configurations using a stochastic or deterministic method, wherein:

when determining to exploit the set of configurations, the second configuration is selected based on a ranking of the updated set of reward metrics, and when determining to explore the set of configurations, the second configuration is selected based on a current uncertainty or variance of a corresponding reward metric; and re-configuring the set of containers with the second configuration.

12. The method of claim 11, wherein the selection algorithm includes at least one an epsilon-greedy algorithm, a softmax algorithm, an upper confidence bound (UCB) algorithm, Thompson sampling, or an exponential-weight algorithm for exploration and exploitation.

13. A computing system for managing computational resources when implementing an application, the system comprising:

a processor device; and a computer-readable storage medium, coupled with the processor device, having instructions stored thereon, which, when executed by the processor device, perform actions comprising:

monitoring utilization data for a set of containers that was configured with a first configuration of a set of configurations, wherein each configuration of the set of configurations corresponds to a separate allocation of the computational resources for the set of containers, each configuration corresponds to a separate arm of a multi-arm bandit (MAB) decision process, and the container utilization data encodes a utilization of a first allocation of the computational resources, corresponding to the first configuration, when the set of the containers implements the application under a first workload;

updating a set of reward metrics, wherein each reward metric of the set of reward metrics corresponds to a separate configuration of the set of configurations and updating the set of rewards metrics includes updating a first reward metric of the set of the set of reward metrics, corresponding to the first configuration, based on an analysis of the container utilization data;

employing a selection algorithm as part of a Markov Decision Process (MDP) to select a second configuration of the set of configurations based on the updated set of reward metrics, wherein the selection by the selection algorithm determines between exploiting the updated set of reward metrics and exploring the set of configurations, wherein when determining to exploit the set of configurations, the second configuration is selected based on a ranking of the updated set of reward metrics, and when determining to explore the set of configurations, the second configuration is selected based on a current uncertainty or variance of a corresponding reward metric; and re-configuring the set of containers with the second configuration.

14. The computing system of claim 13, wherein the second configuration is the first configuration.

15. The computing system of claim 13, wherein each configuration of the set of configurations includes an initial number of processing devices of the computing resources that are initially provided to the first set of containers when implementing the application under the first workload and the utilization data further encodes:

a time series of an actual number of processing units of the computing resources that are provided to the first set of containers when implementing the application under the first workload; and a time series of a number of processing devices that the first set of containers utilize when implementing the application under the first workload.

16. The computing system of claim 15, wherein the analysis of the utilization data comprises:

generating a time series of a difference between the actual number of processing units that are provided to the first set of containers when implementing the application under the first workload and the number of processing devices that the first set of containers utilizes when implementing the application under the first workload;

determining a processor-waste metric based on a summation of the time series of the difference between the actual number of processing units that are provided to the first set of containers when implementing the application under the first workload and the number of processing devices that the first set of containers utilizes when implementing the application under the first workload; and determining a value for the updated first reward metric based on the processor-waste metric.

17. The computing system of claim 13, wherein each configuration of the set of configurations includes a lower-utilization threshold indicating a first condition that triggers a scale-up event for the first set of containers when implementing the application under the first workload and an upper-utilization threshold indicating a second condition that triggers a scale-down event for the first set of containers when implementing the application under the first workload, and the utilization data encodes:

a time series of a number of scaling events for the first set of containers when implementing the application under the first workload that includes a combination of a number of the scale-up events for the first set of containers when implementing the application under the first workload and a number of the scale-down events for the first set of containers when implementing the application under the first workload.

18. The computing system of claim 17, wherein the analysis of the utilization data comprises:

determining a scaling-event metric based on a summation of the time series of the number of scaling events for the first set of containers when implementing the application under the first workload; and determining a value for the updated first reward metric based on the scaling-event metric.

* * * * *